| United States Patent [19] | [11] Patent Number: 5,036,356 |
| --- | --- |
| Lo | [45] Date of Patent: Jul. 30, 1991 |

[54] 3-D CAMERA, PRELOADED AND INTEGRATED HIGH-SPEED PRINTING SYSTEM

[76] Inventor: Allen K. W. Lo, 5022 Hidden Branches Dr., Dunwoody, Ga. 30338

[21] Appl. No.: 499,665

[22] Filed: Mar. 27, 1990

[51] Int. Cl.⁵ .................... G03B 35/14; G03B 27/32
[52] U.S. Cl. .................................................. 355/77
[58] Field of Search ................. 355/22, 77; 354/114, 354/115

[56] References Cited

U.S. PATENT DOCUMENTS 4,903,069  2/1990  Lam ........................................ 355/22

*Primary Examiner*—L. T. Hix
*Assistant Examiner*—D. Rutledge
*Attorney, Agent, or Firm*—Harold L. Marquis

[57] ABSTRACT

The method of checking the off-alignment and identifying the relative position of lenses in a multi-lens, 3-D camera and calibrating the coordinates of the positions of the components (i.e., 2-D view, projecting lens or print material easel) of a printing system. The method for the automatic correlation of 2-D views for the composing of high quality 3-D photographs by taking the first set of 2-D photographs on the film of a target at a predetermined distance. The target images are projected onto a group of CCD sensor arrays placed at the image plane of the printer with each individual sensor of the CCD array precalibrated, and a computer on the printer is programmed to recognize the location of the target images on the CCD array and to control the motors on the printer to adjust the position of the enlarging lens, the easel or the 2-D view in order to correlate the 2-D views for the aligning of the photographed image on the print material at the time of composing of the 3-D photograph.

8 Claims, 7 Drawing Sheets

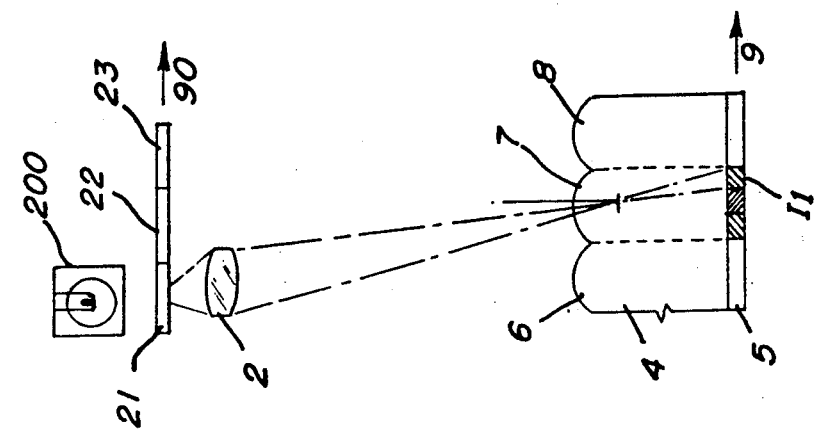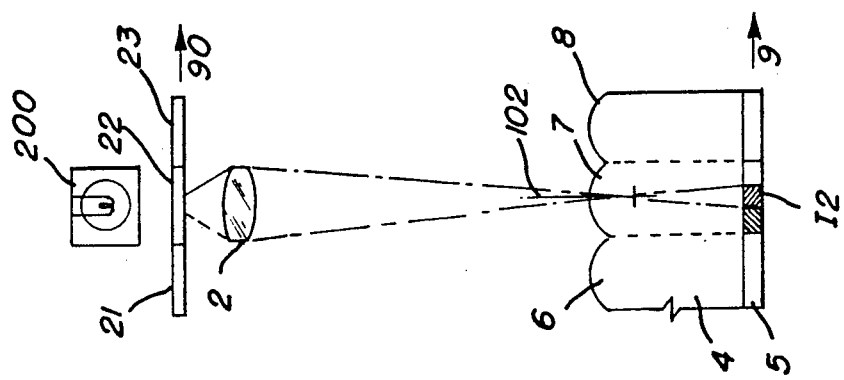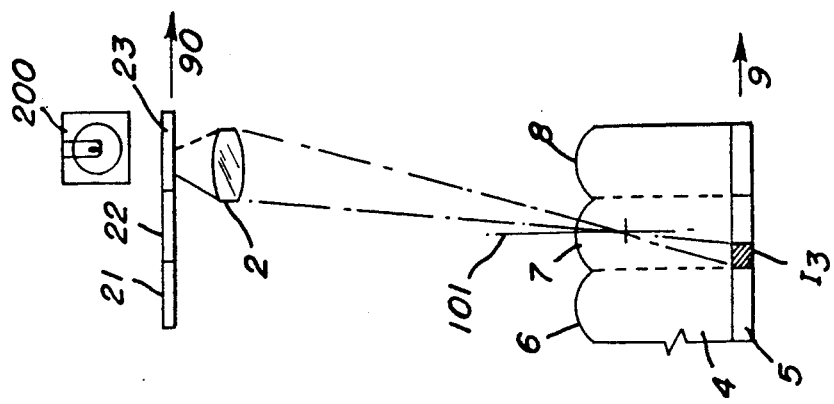
FIG. 2

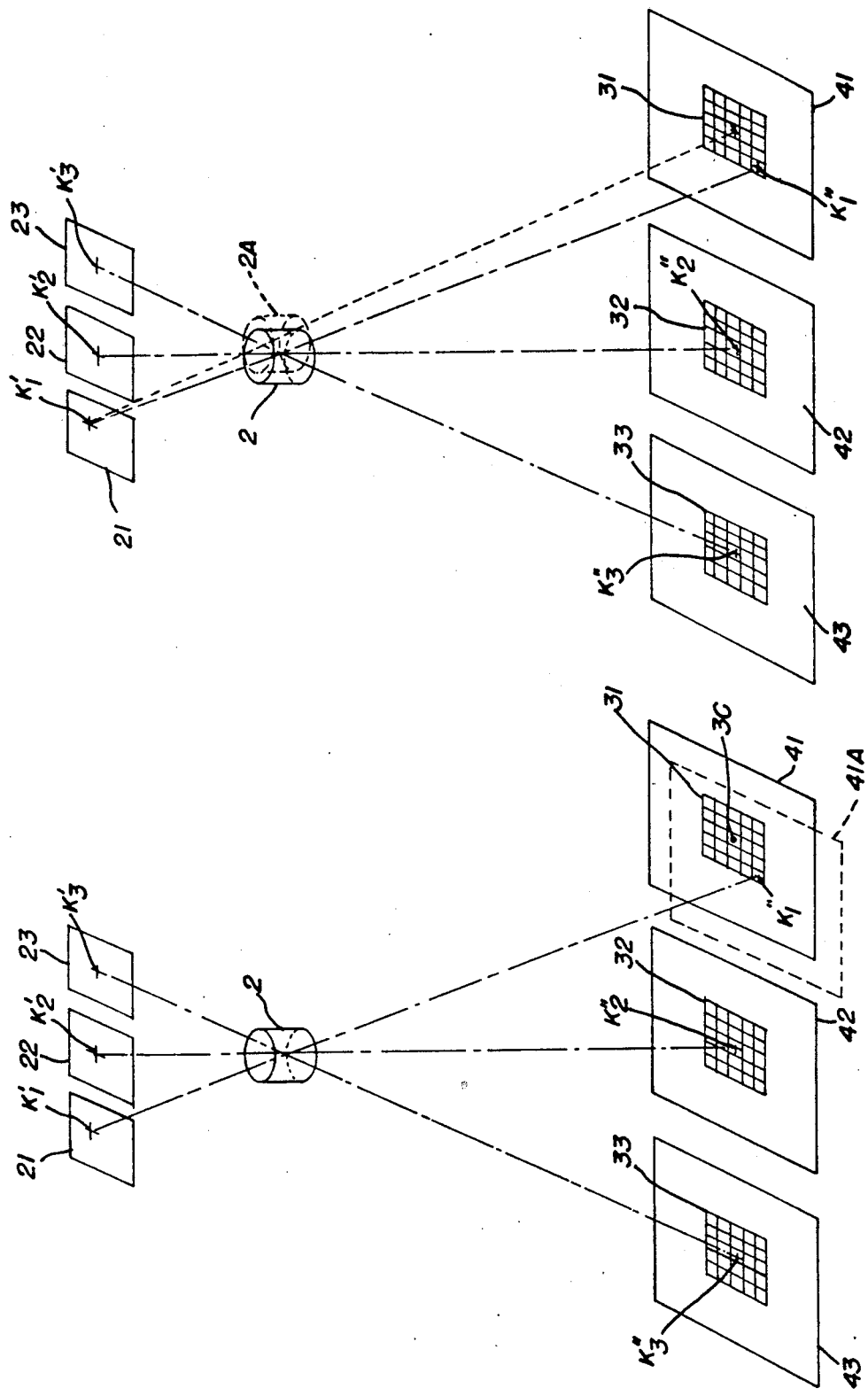

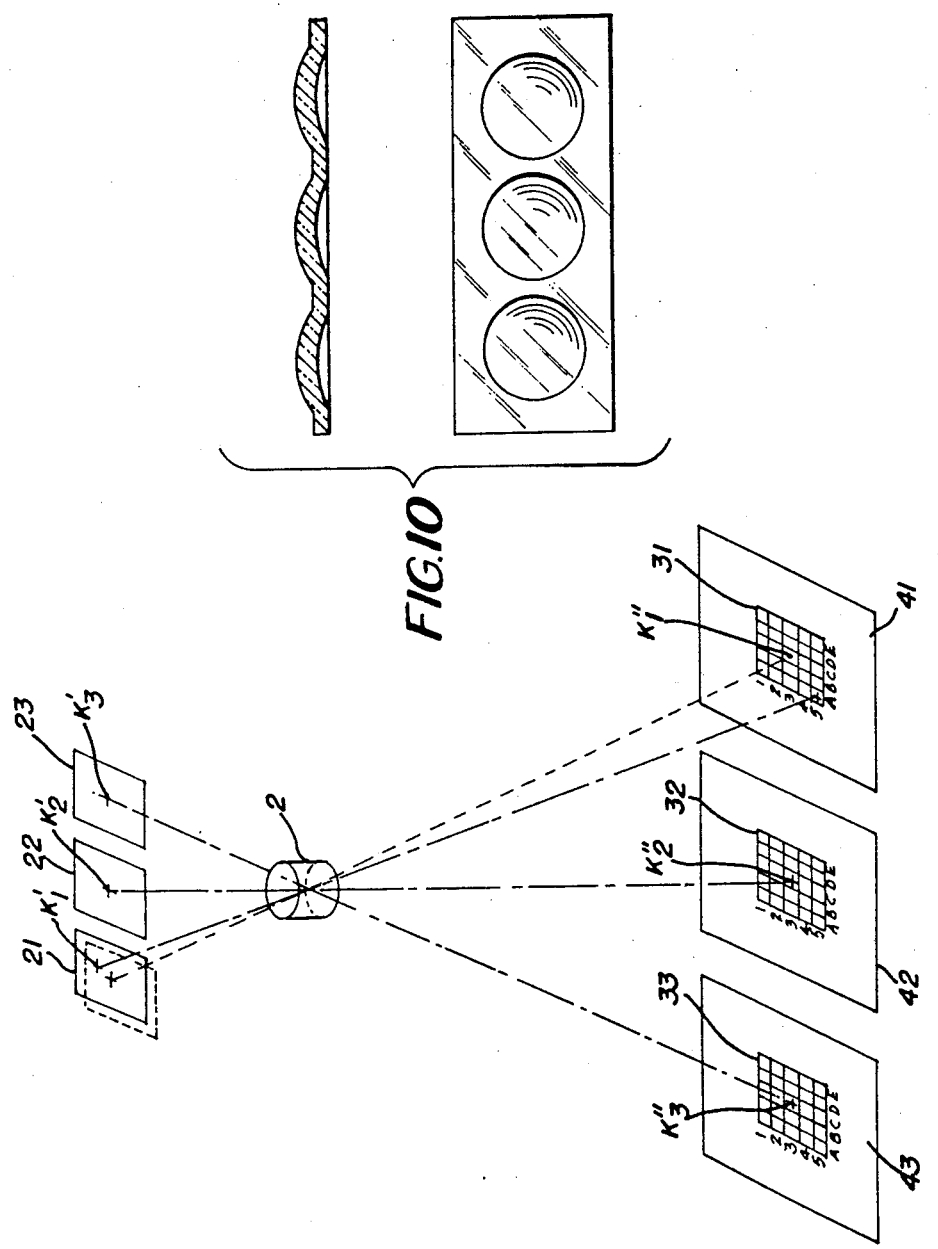

3-D CAMERA, PRELOADED AND INTEGRATED HIGH-SPEED PRINTING SYSTEM

PRIOR ART

Lenticular screen type 3-D pictures are produced by composing a sequence of two-dimensional views of an object photographed from different vantage points onto a lenticular print film.

The two-dimensional views are projected either sequentially or simultaneously through a lenticular screen exposing the photographic emulsion coating at the focal plane of the lenticules.

At the time of composing, the 2-D views must be perfectly aligned in order to register the photographed images properly on each 3-D print.

U.S. Pat. No. 4,800,407 (Lo) discloses a three lens camera for taking 3-D photographs.

N. A. Valyus in "Stereoscopy" (Focal Press, 1966) at pages 199-203 discloses printing right and left images simultaneously onto the film. Only one condensed image from each two-dimensional view is printed.

Dudley "Applied Optics & Optical Engineering" (Rudolf Kingslake, Ed., 1965) discloses at pages 114-116 the movement of the lenticular screen and the intermittent exposure of each of the eight images recorded on the film.

Okoshi in "Three-Dimensional Imaging Techniques" (1976) on pages 71-88 discloses the use of several projectors to project the images onto the emulsion.

Lo and Nims in U.S. Pat. No. 3,895,867 (July 22, 1975) Col. 8 disclose a technique for recording images on all of the film areas underlying the lenticules. This was achieved by repeatedly turning off the light on the projector and intermittently shifting the screen or film.

The following patents also disclose early composing techniques for three-dimensional pictures:

Japanese Patent No. 42-5473 issued 3/6/67
Japanese Patent No. 49-607 issued 1/9/74

Lo and Nims in U.S. Pat. No. 4,120,562 (Oct. 17, 1978) disclose a method of scanning the projected image to fill the lenticule with images. The composing apparatus disclosed in this patent is also structured for changing the angle of projection by a predetermined amount during the scanning operation.

U.S. Pat. No. 4,852,972 (Lo) discloses an improved method of printing three-dimensional images which involves using a greater intensity of light when exposing the image bands near the edges of the lenticule and those near the center. This results in obtaining image bands of substantially equal density across the width of the lenticule. The method of this patent can be used to produce a single image element in each image band area. However, the quality of the three-dimensional pictures produced by this method is enhanced by reproducing two-dimensional views into a multiple number of discreet condensed images which are printed edge to edge under the lenticules of the lenticular print film with minimal overlapping or without being interrupted by unexposed strips between the discreet condensed images. The method of this patent results in equalizing the density of images across the field of the lenticule resulting in improved picture quality.

Lao in U.S. Pat. No. 4,468,115 (Aug. 28, 1984) discloses a projector in which the lamp housing moves continuously to prevent jerking due to rapid stops and starts. Its continuous scanning results in considerable overlapping of images which reduces the sharpness of the picture.

U.S. Pat. No. 4,101,210 (Lo et al) discloses a method of avoiding the gaps between adjacent, condensed images in an image band by using a plurality of projection lenses along a plurality of rows parallel to the lenticular screen. This patent also shows arranging the negatives in parallel rows in the projection process. The use of a large number of projection lenses arranged in rows and the large number of negatives used in this process makes it cumbersome. This multi-lens projection system is also disclosed in U.S. Pat. 4,132,468 (Lo et al).

SUMMARY OF THE INVENTION

In order to make 3-D photography affordable for many consumers, it is desirable to manufacture a 3-D camera that is very inexpensive and an automatic high-speed printer. The problem in manufacturing an inexpensive multi-lens 3-D camera is that the lenses of the camera may be off-aligned, and it is very difficult to maintain the identical relative position of the camera lenses of each individual camera manufactured. Therefore, the relative position of the photographed object image on the 2-D views are not identical between sets of 2-D views photographed by different cameras. The unpredictable position of the photographed object image on the film causes automatic correlation of the 2-D views for the registration of the key subject image of the 3-D photograph to be impossible. It is desirable to have all of the lenses of the multi-lens 3-D camera cast with one common support to minimize the off-alignment problem. It is also desirable to have the inexpensive camera preloaded with photographic film which can be disposed of after the roll of film has been exposed, or it can be reloaded with a new roll of film at the lab when the camera is turned in for processing.

When the lenses of a multi-lens 3-D camera are misaligned and the relative positions of the lenses are unknown, the photographic images from each 2-D view of a 3-D photograph can be correlated by visually checking the location of the photographed image on each 2-D view and manually or mechanically adjusting the position of the enlarging lens or the print material easel when printing each of the 2-D views. This process is very complex, time consuming and unreliable, and results in making mass-production of 3-D photographs for the consumer market impractical.

This problem has been solved by designing an automatic printing system including a "dedicated" multi-lens 3-D camera preloaded with photographic film where the data of the camera's lenses positions are prerecorded on the negative film. This is accomplished by taking the first set of photographs by that particular camera of a target at a predetermined distance before the delivery of the camera to the consumer. This data now recorded on negative film is used as a reference or datum points for the calibration of the coordinates of the positions of the various components of the printing system (i.e., projecting lens, easel or 2-D views) in order to compensate during printing for any off-alignment of the camera lens.

At the time of printing, the target images on the first set of negatives are sequentially or simultaneously projected onto a single CCD sensor array, or onto a corresponding number of CCD sensor arrays placed at the image plane of the printer. The positions of the CCD sensor arrays are precalibrated so that each target image should project on a designated sensor (i.e., the center sensor of the CCD array) of each CCD array, in a case where the camera lenses are correctly aligned. Each individual sensor is precalibrated, and the computer on the printer is programmed to recognize the new location of an off-aligned projected target image. When a target image is projected off the center "designated" sensor (due to off-alignment of the camera lens), the computer will control the motors on the printer to adjust the positions of the 2-D view, the projecting lens or the easel to calibrate the printing system to recenter the off-aligned target image. Consequently, the technique of the detection of the off-alignment of the camera lens and the calibration of the printer provides automatic correlation of the 2-D views to register the photographed image on each 3-D photograph taken on the same roll of film or taken by the same camera. Manual correlation of the photographed image of each 2-D view is not now necessary.

BRIEF DESCRIPTION OF THE DRAWINGS

FIG. 2 is a diagrammatic view of a printing system printing a sequence of 2-D views by a 3-D multi-lens camera.

FIG. 6 is a diagrammatic view of a printing system where an off-position target is detected by the computer and recentered by repositioning the printer easel.

FIG. 7 is a diagrammatic view of a printing system where the off-position of the projected target is compensated for and recentered by repositioning the enlarging lens when printing 2-D view 21.

FIG. 8 is a diagrammatic view of a printing system where the off-position of the projected target is compensated for and recentered by adjusting the location of the 2-D view.

FIG. 10 is a cross sectional and a top view of the camera lens assembly of the multi-lens camera where all of the lens elements are cast with a common support.

DETAILED DESCRIPTION OF THE DRAWINGS

Figure 1:
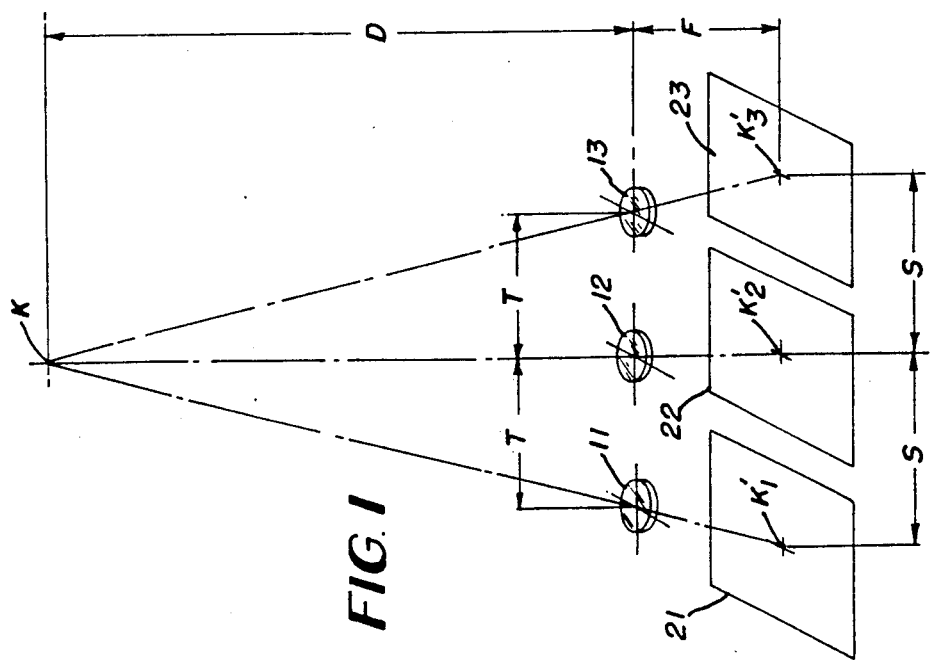
FIG. 1 is a diagrammatic view of a multi-lens camera with preloaded film which has been exposed to a predetermined target at a distance 'D' from the camera.

FIG. 1 is a diagrammatic view of a multi-lens 3-D camera (preloaded with photographic film) with the first set of negatives being exposed to a target at a predetermined distance D from the camera, where D is the ideal photographic distance for 3-D pictures and where the camera's lenses are prefocused. The camera has three lenses 11, 12 and 13 which have photographed target K. The target images $K'_1$, $K'_2$ and $K'_3$ are recorded at the appropriate location on the 2-D views 21, 22, and 23. Distance S is the relative position of the target images $K'_1$, $K'_2$ and $K'_3$ and is the function of T, F, and D and can be computed by the following equation:

$$S = \frac{T(D + F)}{D}$$

Where
S is the distance between the target images of the adjacent 2-D views
T is the separation of the camera lens
D is the distance from the camera to the photographed object
F is the back focal distance of the camera lens FIG. 2 is a diagrammatic view illustrating the sequence for printing. All of the lenticules of the print material are exposed at the same time but only one lenticule 7 is shown being exposed in FIG. 2. When print material 4 is placed in the proper position (projection angle) 101, 2-D view 23 moves in direction 90 under lamphouse 200 exposing image band $I_3$ on emulsion layer 5 of lenticule 7. After this portion of the print material has been exposed, the print material 4 is moved to position (projection angle) 102 in direction 9, and 2-D view 22 moves in direction 90 under lamphouse 200 and exposes image band $I_2$ next to image band $I_3$. The print material 4 advances to position (projection angle) 103 and the 2-D 21 under lamphouse 200 and exposes image band $I_1$ next to image band $I_2$ to fill up all of the lenticules completing the composition of the 3-D picture.

Figure 3:
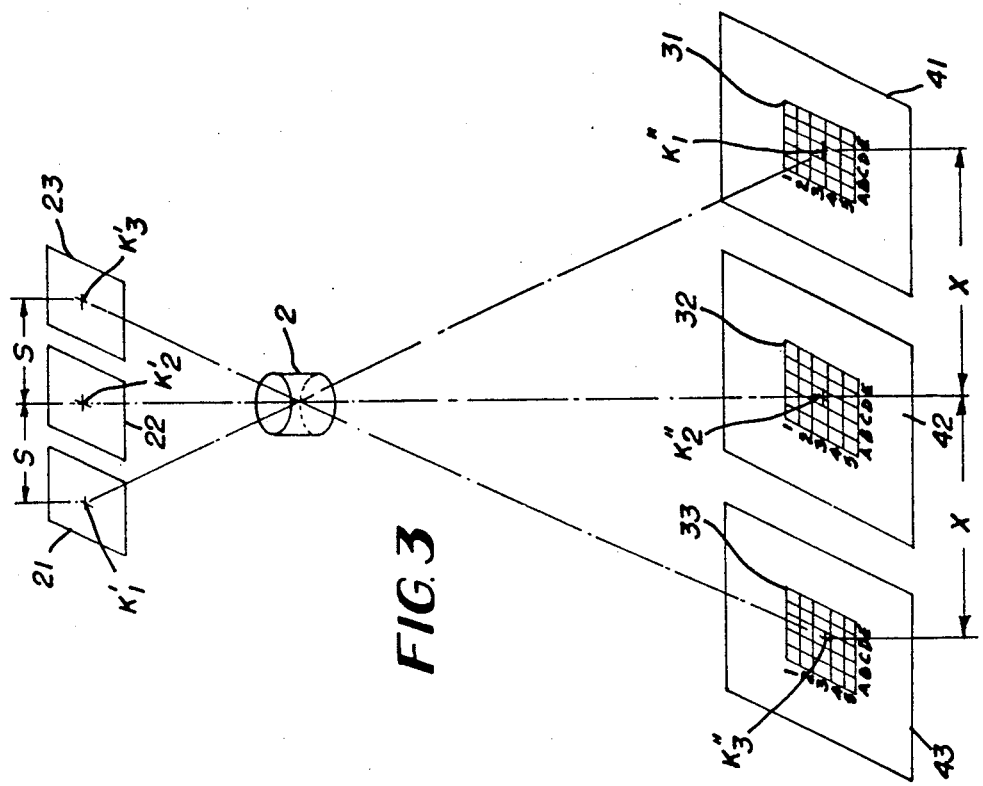
FIG. 3 is a diagrammatic view of the printing system with the image of the target being projected onto the designated, center sensor of the CCD image sensor array which is set at the image plane of the printer to detect the location of the target. In this case the lenses of the camera are perfectly aligned.

FIG. 3 is a diagrammatic view illustrating the projecting of the target image for the first set of 2-D views onto the CCD sensor arrays for the calibration of the printing system. The printer has a projection lens 2, 2-D view 21 with its image target $K'_1$ projected at the center sensor 3C of the CCDs sensor array 31 at location 41. $K'_1$ is projected as $K''_1$; $K'_2$ is projected as $K''_2$ and $K'_3$ is projected as $K''_3$ on the center sensor 3C of all three CCD sensor arrays located at positions 41, 42 and 43.

The first set of photographs with 2-D views 21, 22 and 23 as shown in FIG. 3 is photographed by a 3-lens camera as illustrated in FIG. 1 with all the camera lenses 11, 12 and 13 perfectly aligned. Therefore, target image $K'_1$, $K'_2$ and $K'_3$ are exposed at the appropriate locations on 2-D views 21, 22 and 23, and projected target images $K''_1$, $K''_2$ and $K''_3$ are projected right at the center sensor 3C of all the CCD sensor arrays 31, 32 and 33 which are precalibrated at locations 41, 42 and 43. Therefore, adjustment of the position of 2-D views, projection lens or the print material easel, is not necessary.

Figure 4:
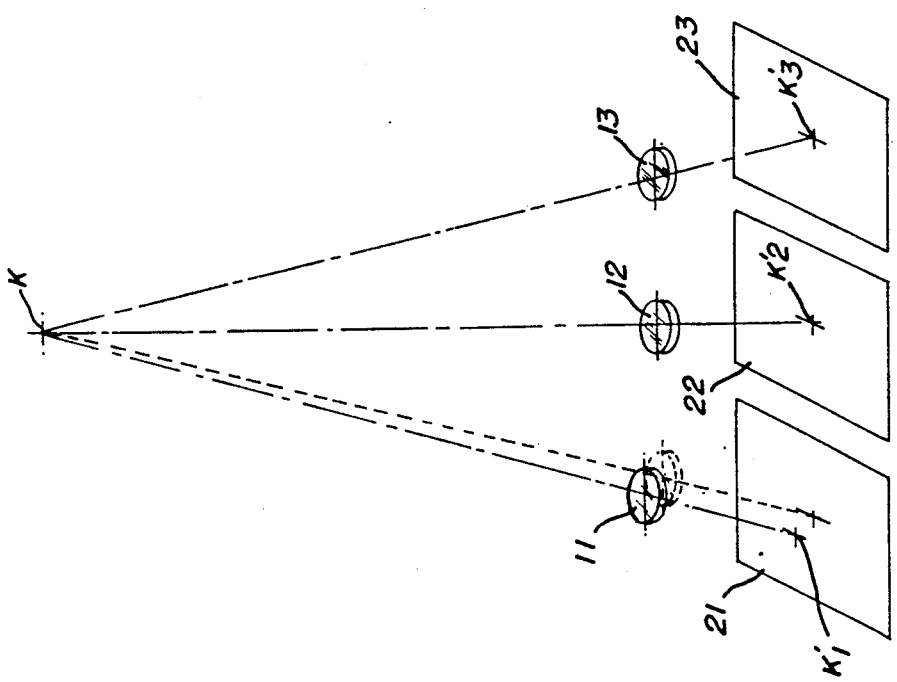
FIG. 4 is a diagrammatic view of a multi-lens camera in which one of the lenses is off-aligned with the respective exposed target image on the negative being off position.

FIG. 4 illustrates a multi-lens 3-D camera with lens 11 out of alignment and recording target image $K'_1$ also off position on 2-D view 21. Lenses 12 and 13 are in proper alignment.

Figure 5:
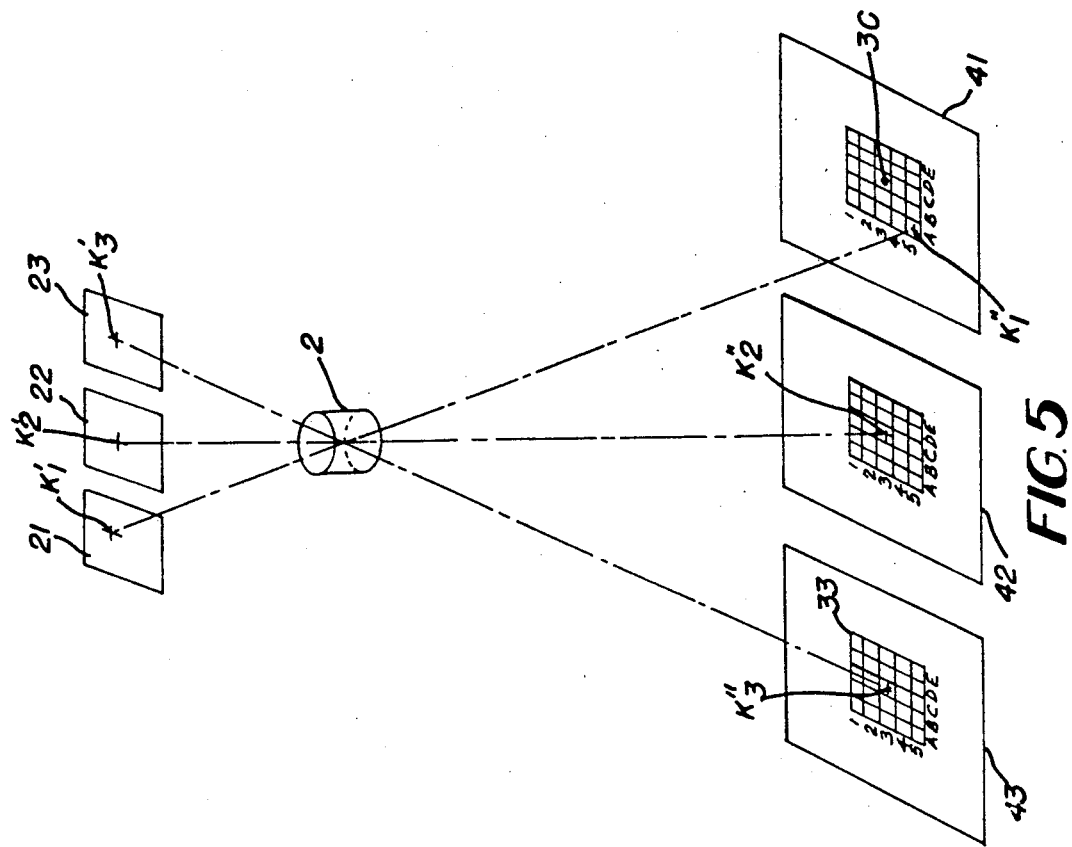
FIG. 5 is a diagrammatic view of a printing system projecting the 2-D views exposed by a multi-lens camera, in which one of the camera lens is off-aligned and showing that one of the target images is projected off the center of the CCD image sensor array.

FIG. 5 illustrates a printer projecting the first set of 2-D views of the target exposed by a multi-lens camera with a lens out of alignment as illustrated in FIG. 4. The position of lens 11 of the camera that takes the 2-D view 21 is off-alignment. Consequently, in projecting 2-D view 21 at the CCD sensor array 31, target image $K''_1$ is projected at sensor 5A instead of being projected at sensor 3C as are the other 2-D views.

FIG. 6 illustrates the calibration of the printing system by the adjustment of the print material easel to compensate for the off-alignment of the lens of the camera. The position of lens 11 of the camera, as illustrated in FIG. 4, which takes 2-D view 21 is off-alignment. Consequently, in printing of view 21 at location 41, the print material easel needs to be moved to location 41A so that its center 3C will align to sensor 5A to compensate for the off-alignment of the camera lens 11 as illustrated in FIG. 4. As illustrated in FIG. 4, the lenses of the camera that takes the 2-D views 22 and 23 are in correct alignment. Consequently, no adjustment is necessary in printing of these views. The print material easel is simply moved to the precalibrated x and y coordinates of locations 42 and 43. In the case of location 41, the print material easel is moved to the left from C to A along the x coordinate and is moved from 3 to 5 along the y coordinates. The computer for making this adjustment is not shown in this figure.

Alternatively, the enlarging lens can be recentered to compensate for the off position of the lens 11 in the camera.

FIG. 7 illustrates the calibration of the printing system by the adjustment of the projecting lens 2 of the printer where printing of 2-D view 21 to compensate for the off-alignment of the lens 11 of the camera as illustrated in FIG. 4, so that target image K"₁ of target K'₁ of 2-D view 21 will be projected at sensor 3C of CCD array 31 of print material easel at position 41.

In an additional method the 2-D view of the negative can be moved to compensate for the off-alignment of any lens.

FIG. 8 illustrates the calibration of the printing system by the adjustment of the 2-D view 21 to compensate for the off-alignment of lens 11 of the multi-lens camera in FIG. 4, so that image target K'₁ will be projected at sensor 3C of CCD array 31 of print material easel at location 41.

Regardless of whether the 2-D negative view, enlarging lens or printing easel is moved, this is coordinated by a computer that is linked to a CCD array and to positioning motors.

Figure 11:
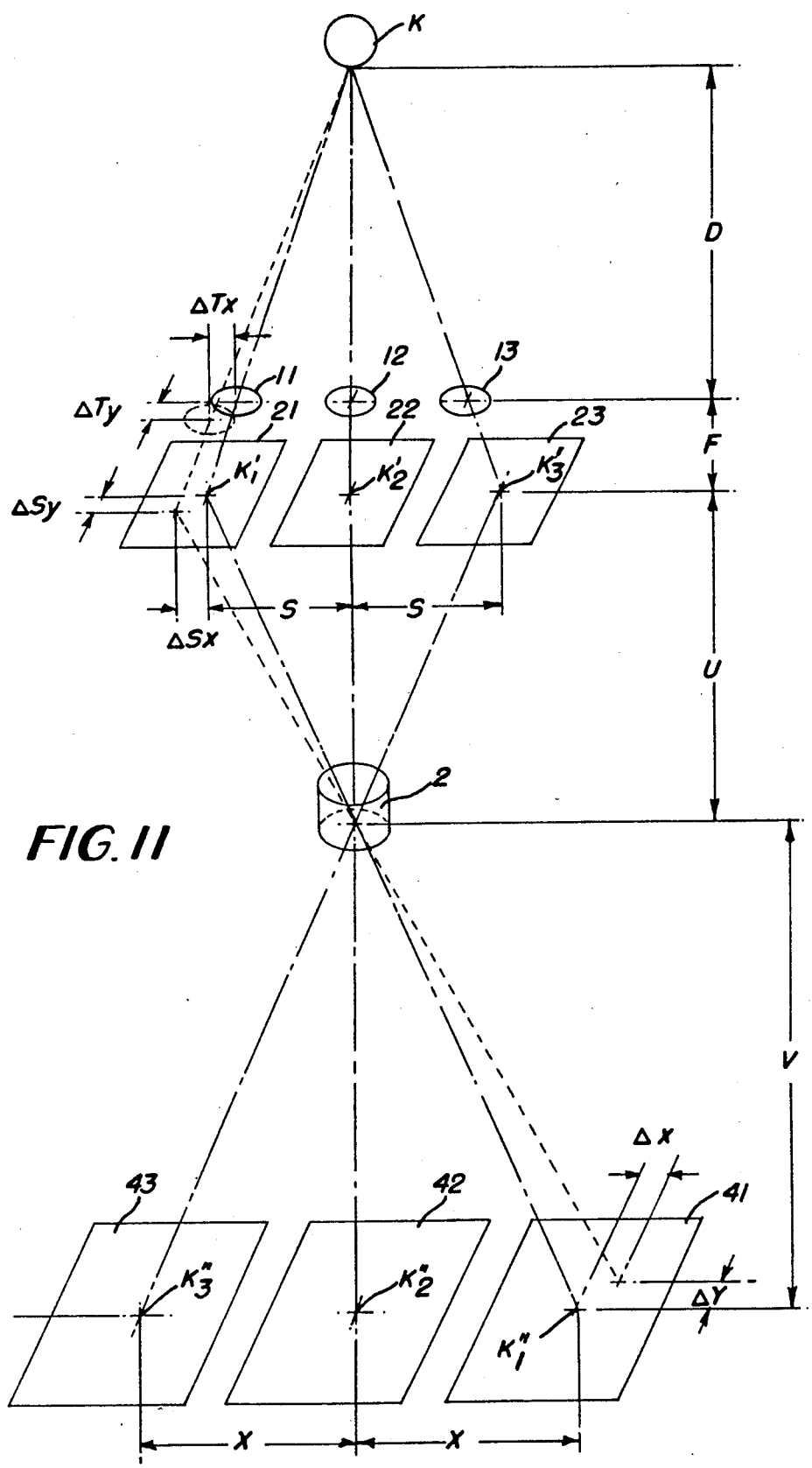
FIG. 11 is a diagrammatic view of a printing system illustrating the method of correcting the off-position of the projected target in the printing process.

FIG. 11 is a diagrammatic view illustrating the factors that need to be determined in order to compensate for the off-alignment of any lens in the camera. The following formulae can be used in the program for the computer to determine the extent to which the print material, enlarging lens or negatives need to be moved to compensate for the off-alignment of any lens:

A. Formula for determining the amount of offset needed in the X direction.

$$\Delta X = \frac{\Delta Tx(D + F)R}{D}$$

B. Formula for determining the amount of offset needed in the Y direction.

$$\Delta y = \frac{\Delta Ty(D + F)R}{D}$$

where
$\Delta X$ is the amount of adjustment required in the X direction to compensate for the off-alignment of the camera lens;

$\Delta y$ is the amount of adjustment required in the y direction to compensate for the off-alignment of the camera lens;

$\Delta Tx$ is the distance of off-alignment of the camera lens in the X direction;

$\Delta Ty$ is the distance of off-alignment of the camera lens in the y direction;

D is the distance from the camera to the photographed object;

F is the Back Focal Distance of the camera lens; and

R is the enlargement ratio (V/U)

The above formulae can be used to determine the amount of adjustment needed at the printer's image plane to compensate for any off-alignment of any camera lens.

The CCD sensors will determine the position of the projected image, and the computer will utilize the formula to make any appropriate adjustments to compensate for the off-alignment of the lens.

FIG. 11 illustrates all of the various factors needed in compensating for the off-alignment of the camera lens by adjusting the print material at the image plane of the printer. As illustrated in FIG. 11 the image from camera lens 11 shows an amount of adjustment by the amount of $\Delta y$ and $\Delta x$ of the image plane in printing print material 41. This amount of off adjustment can be computed by utilizing formula A (and B) which can be programmed into the computer to make the compensation and to move the print material 41 to the proper position.

The off-alignment of the camera lens can be adjusted by moving the negative view 21 taken by the camera lens which is off-alignment as illustrated in FIG. 11. The following formulae can be utilized to determine the amount to which the 2-D negative view must be moved to compensate for the off-alignment of the camera lens:

C. Amount of offset required in the x direction $$\Delta Sx = \frac{\Delta Tx(D + F)}{D}$$

D. Amount of offset required in the y direction $$\Delta Sy = \frac{\Delta Ty(D + F)}{D}$$

Where
$\Delta Sx$ is the distance the 2-D negative view is to be moved to compensate for the off-alignment of the camera lens in the x direction;

$\Delta Sy$ is the distance the 2-D negative view is to be moved to compensate for the off-alignment of the camera lens in the y direction;

Formulae C and D can be programmed into a computer controlling the negative carrier of a printer to move negative view 21 by a distance $\Delta Sy$ in the y direction and by an amount of $\Delta Sx$ in the x direction to compensate for the off-alignment of camera lens 11. The camera lens in FIG. 11 is off-alignment by amount $\Delta Tx$ and $\Delta Ty$.

Figure 9:
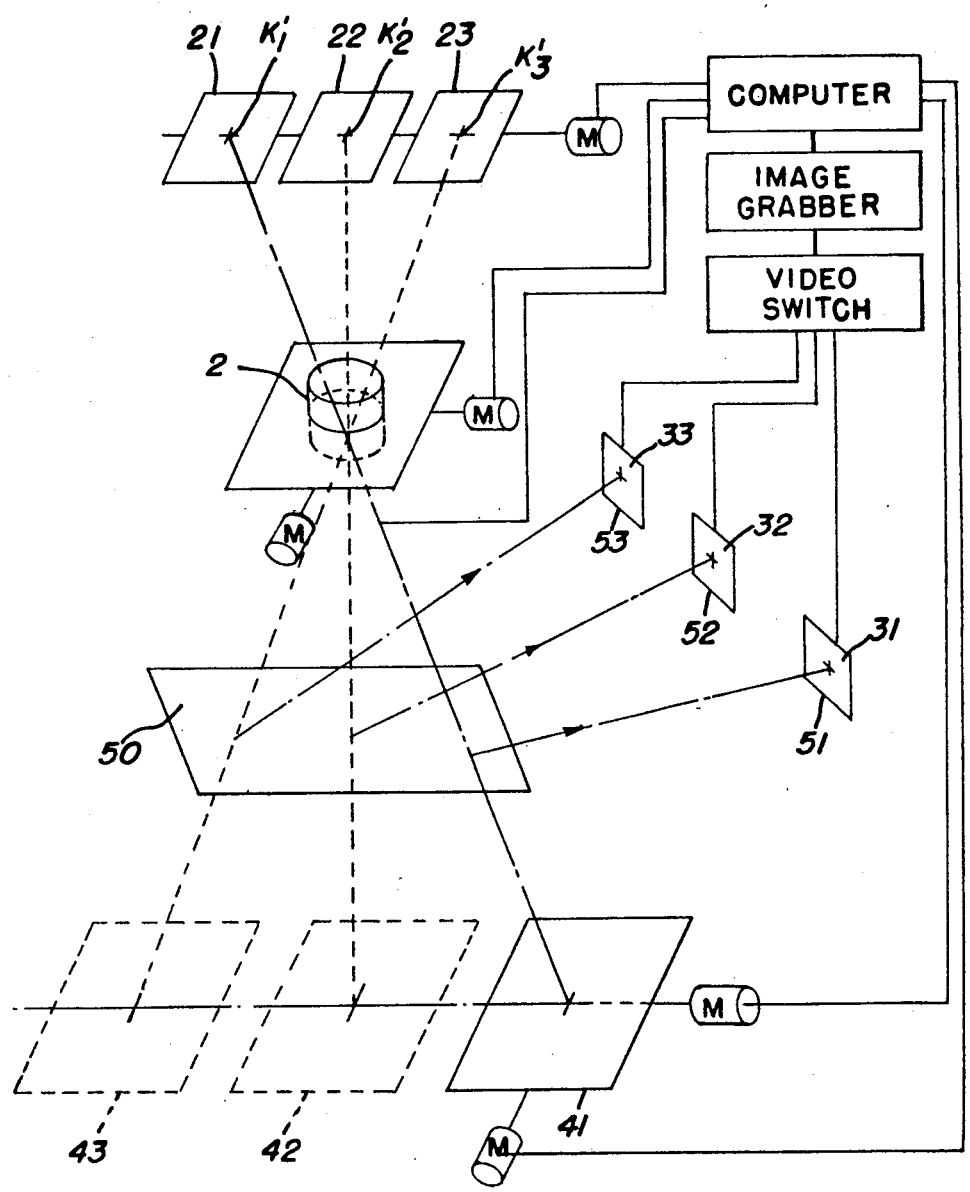
FIG. 9 is a diagrammatic view of a printing system in which the CCD sensors are set at a different plane, reflected by a mirror, or a beam splitter.

FIG. 9 illustrates the printer in which the CCDs arrays 31, 32, 33 can be placed at another plane 51, 52 and 53 by utilizing a mirror or a beam splitter 50. In this case the light is reflected by a mirror or a beam splitter 50 with corresponding image arrays 51–53 located in positions corresponding to the centers locations 41, 42, and 43. The image arrays are connected to a video switch with an image grabber and in turn connected to a computer that controls motors to move either the negative view or the enlarging lens or the printing easel into proper position.

FIG. 10 is a diagrammatic view of the cross section and top view of a lens array for a 3-D camera. These lenses are cast as with one common support and encompasses camera lenses 11, 12 and 13 to minimize off-alignment of the lenses. Each camera lens can be a single-element lens or a multi-element lens.

In utilizing this system, the first set of 2-D negatives is not printed but is simply projected on the image plane of the printer to establish the location of the projected target image in order to determine the off-alignment of the camera lenses of the multi-lens 3-D camera for the purpose of calibrating the coordinates of the positions of the various components of the printer for the automatic correlating of the 2-D views for the alignment of the photographed object for the composing of high-quality, 3-D photographs.

Either a computer or microprocessor can be utilized to make the necessary adjustment for the off-alignment. The utilization of the computer or microprocessor plus the CCD sensors and positioning motors eliminates the need for manually repositioning the negative and the enlarging lens in order to properly align the key subject of each 2-D view of a 3-D photograph for the printing of each view.

I claim:

1. A method for compensating for any off alignment of the lenses in a 3-D camera in the printing of 2-D views which comprises:
    a. Exposing the first set of 2-D views of the film in the camera to a target at a predetermined distance;
    b. Projecting the first set of 2-D views in a 3-D printer with an image processor to determine the x and y axis of each of the images in the printing plane of the printer; and
    c. Entering the x and y coordinates of each of the projected images into a microprocessor programmed to automatically adjust the position of each subsequent 2-D view in each set of 2-D views to the desired position by moving means in order to compensate for any off alignment of the camera lens on the x and y axis in printing each of the views in accordance with the directions from the microprocessor.

2. The method of claim 1 in which the determination of the x and y coordinates of the target of each of the images of the first set of 2-D negative views is determined visually in the printing plane, and these coordinates are entered into the microprocessor programmed to automatically adjust the position of each subsequent 2-D view and moving means in the printing process in order to bring each 2-D view into proper alignment along the x and y coordinates before printing such view.

3. The process of claim 1 in which the determination of the x and y coordinates of the target of each of the images of the first set of views is determined by CCD sensors which are linked to a microprocessor programmed to automatically adjust the position of each subsequent 2-D view in each set of 2-D views by moving means in the printing process into proper position before printing of each 2-D view.

4. The method of claim 3 in which the CCD sensors are located in the printing plane of the printer.

5. The method of claim 3 in which the microprocessor is linked to a motor and drive which moves a printing easel into proper position for the printing of each 2-D view.

6. The method of claim 3 in which the microprocessor is linked to a motor and drive which moves the projecting lens into proper position for the printing of each 2-D view in order to correct any off-alignment of the camera lens in a 3-D camera.

7. The method of claim 5 in which the microprocessor is programmed to automatically move the printing easel into proper position for the printing of each 2-D view in accordance with the following formulae:

A. formula for determining the amount of offset needed in the X direction.

$$\Delta X = \frac{\Delta Tx(D + F)R}{D}$$

B. formula for determining the amount of offset needed in the Y direction.

$$\Delta y = \frac{\Delta Ty(D + F)R}{D}$$

where
  $\Delta X$ is the amount of adjustment required in the X direction to compensate for the off-alignment of the camera lens;
  $\Delta y$ is the amount of adjustment required in the y direction to compensate for the off-alignment of the camera lens;
  $\Delta Tx$ is the distance of off-alignment of the camera lens in the X direction;
  $\Delta Ty$ is the distance of off alignment of the camera lens in the y direction;
  D is the distance from the camera to the photographed object;
  F is the Back Focal Distance of the camera lens; and
  R is the enlargement ratio (V/U).

8. The method of claim 6 in which the microprocessor is programmed to automatically adjust the position of each 2-D negative in the negative carrier into proper position for printing utilizing the following formulae:

C. amount of offset required in the x direction $$\Delta Sx = \frac{\Delta Tx(D + F)}{D}$$

D. amount of offset required in the y direction $$\Delta Sy = \frac{\Delta Ty(D + F)}{D}$$

where
  $\Delta Sx$ is the distance the 2-D negative view is to be moved to compensate for the off-alignment of the camera lens in the x direction;
  $\Delta Sy$ is the distance the 2-D negative view is to be moved to compensate for the off-alignment of the camera lens in the y direction;
  $\Delta Tx$ is the distance of off-alignment of the camera in the X direction;
  $\Delta Ty$ is the distance of off alignment of the camera lens in the y direction;
  D is the distance from the camera to the photographed object; and
  F is the Back Focal Distance of the camera lens.

* * * * *